United States Patent
Cleale, IV et al.

[11] Patent Number: 6,162,455
[45] Date of Patent: Dec. 19, 2000

[54] METHOD FOR INCREASING LEAN MEAT, IMPROVING THE LEAN MEAT TO FAT RATIO AND IMPROVING AMINO ACID UTILIZATION IN WARM-BLOODED ANIMALS

[75] Inventors: Ralph M. Cleale, IV, Fairless Hills, Pa.; Mark H. Pausch, Robbinsville; John R. Hadcock, Mount Holly, both of N.J.

[73] Assignee: American Cyanamid Company, Madison, N.J.

[21] Appl. No.: 08/986,522

[22] Filed: Dec. 8, 1997

Related U.S. Application Data

[60] Provisional application No. 60/036,148, Jan. 22, 1997.

[51] Int. Cl.[7] .................................................. A23K 1/165
[52] U.S. Cl. ......................... 424/442; 514/280; 514/399
[58] Field of Search ................................ 426/807, 53, 54, 426/810; 424/401, 442; 514/280, 399, 909, 910

[56] References Cited

U.S. PATENT DOCUMENTS

| | | | |
|---|---|---|---|
| 2,785,164 | 3/1957 | Voegtli et al. | 546/50 |
| 3,092,996 | 6/1963 | Luther et al. | 574/280 |
| 3,178,390 | 4/1965 | Robison et al. | 574/280 |
| 3,247,221 | 4/1966 | Augstein et al. | 548/311.7 |
| 4,302,469 | 11/1981 | Kluge, I et al. | 548/311.7 X |
| 4,315,021 | 2/1982 | Kluge, II et al. | 548/311.7 X |
| 4,397,860 | 8/1983 | Chapleo et al. | 548/311.7 X |
| 4,436,914 | 3/1984 | Kluge, III et al. | 548/311.7 |
| 4,446,148 | 5/1984 | Stillings | 548/311.7 |
| 5,422,352 | 6/1995 | Astrup | 574/264 |
| 5,507,790 | 4/1996 | Weiss | 607/100 |
| 5,705,170 | 1/1998 | Kong et al. | 424/401 |

FOREIGN PATENT DOCUMENTS

| | | | |
|---|---|---|---|
| 0598964 | 5/1960 | Canada | 546/50 |
| 0789357 | 1/1958 | United Kingdom | 546/50 |
| 999394 | 7/1965 | United Kingdom | A23K 1/16 |
| 83/04025 | 11/1983 | WIPO | 548/311.7 |

OTHER PUBLICATIONS

H. Mersmann, Comp. Biochem. Physiol., 79C, pp. 165–170 (1984).
T. Ng, Comp. Biochem. Physiol., 82C, pp. 463–466 (1985).
B. Richelsen, European Journal of Clinical Investigation, 16, pp. 302–309 (1986).
J. Galitzky, et al., European Journal of Clinical Investigation, 18, pp. 587–594 (1988).
J. McGrath, et al. Medicinal Research Reviews, 9(4), pp. 407–533 (1989).
L. Coutinho, et al. Comp. Biochem. Physiol., 105A, pp. 333–339 (1993).
R. Pinder and J. Wieringa, Medicinal Research Reviews, 13(3), pp. 259–325 (1993).
R. Ruffolo, et al., Medicinal Research Reviews, 14(2), pp. 229–270 (1994).
Wenkert et al., J. Amer. Chem. Soc., vol. 100, pp. 4894 to 4895 (1978).

*Primary Examiner*—Neil S. Levy
*Attorney, Agent, or Firm*—Barbara L. Renda

[57] ABSTRACT

There is provided a method for increasing lean meat, improving the lean meat to fat ratio and improving amino acid utilization in warm-blooded animals by administering an effective amount of an alpha-2 adrenergic receptor antagonist.

6 Claims, No Drawings

METHOD FOR INCREASING LEAN MEAT, IMPROVING THE LEAN MEAT TO FAT RATIO AND IMPROVING AMINO ACID UTILIZATION IN WARM-BLOODED ANIMALS

This application claims priority from U.S. provisional application Ser. No. 60/036,148 filed on Jan. 22, 1997.

BACKGROUND OF THE INVENTION

The ability to produce leaner animals would have a significant impact on meat production. Several compounds are known to depress fat deposition in warm-blooded animals. However, none of those compounds have been commercialized for use in animals.

Accordingly, there is ongoing research to discover new methods for producing leaner animals.

Certain alpha-2 adrenergic receptor antagonists are known to possess lipolytic activity in vivo (see, for example, J. Galitzky, et al, European Journal of Clinical Investigation, 18, pages 587–594 (1988), B. Richelsen, European Journal of Clinical Investigation, 16, pages 302–309 (1986) and T. Ng, Comp. Biochem. Physiol., 82C, pages 463–466 (1985)). However, H. Mersmann in Comp. Biochem. Physiol., 79C, pages 165–170 (1984) discloses that several α-adrenergic antagonists do not enhance basal or stimulated lipolysis in vitro. And L. Coutinho, et al, in Comp. Biochem. Physiol., 105A, pages 333–339 (1993) disclose that the α-adrenergic antagonist yohimbine has no effect on lipolysis in adipocytes isolated from castrated pigs.

In view of those publications, it is not clear what effect α-adrenergic antagonists have on lipolysis. What is clear, however, is that none of those publications describe a method for producing leaner animals.

GB 999,394 describes animal feed and drink preparations which contain certain 17-methoxy-18-alkoxy-yohimbine derivatives However, that patent does not describe a method for producing leaner animals.

It is, therefore, an object of the present invention to provide a method for increasing lean meat, improving the lean meat to fat ratio and improving amino acid utilization in warm-blooded animals.

It is also an object of the present invention to provide animal feed and animal feed supplement compositions which increase lean meat, improve the lean meat to fat ratio and improve amino acid utilization in warm-blooded animals.

Those and other objects and features of the present invention will become more apparent from the detailed description thereof set forth below.

SUMMARY OF THE INVENTION

The present invention provides a method for increasing lean meat, improving the lean meat to fat ratio and improving amino acid utilization in warm-blooded animals which comprises administering to said animals a lean meat increasing, lean meat to fat ratio improving and amino acid utilization improving amount of an alpha-2 adrenergic receptor antagonist.

The present invention also provides animal feed and animal feed supplement compositions which comprise an alpha-2 adrenergic receptor antagonist.

DETAILED DESCRIPTION OF THE INVENTION

The present invention relates to the use of alpha-2 adrenergic receptor antagonists to increase lean meat, improve the lean meat to fat ratio and improve amino acid utilization in warm-blooded animals.

Lean meat is produced from amino acids present in the form of protein and/or individual compounds in an animal's diet. It would, therefore, be desirable to improve amino acid utilization in order to increase lean meat production. Amino acid utilization may be evaluated by a nitrogen balance study. In a nitrogen balance study, the amount of dietary nitrogen retained in an animal is determined Since nitrogen retention is related to amino acid utilization, an increase in the amount of nitrogen retained indicates that amino acid utilization has improved. Surprisingly, it has been found that alpha-2 adrenergic receptor antagonists increase the amount of nitrogen retained in animals, and, therefore, improve amino acid utilization.

The terms warm-blooded animals and animals as used herein are synonymous and include, but are not limited to, swine, cattle, horses, deer, buffalo, sheep, goats, rabbits, poultry, cats, dogs and humans. The term lean meat as used herein is intended to include the total amount of muscle and/or protein present in warm-blooded animals.

In particular, the present invention benefits animal producers by providing them with a method for producing leaner animals which command higher prices from the meat industry. The method of this invention is especially useful during the growing/finishing period in swine production wherein pigs weighing about 30 kg to 60 kg are brought up to market weight which may be in excess of 150 kg.

Alpha-2 adrenergic receptor antagonists suitable for use in this invention include any compounds that interfere with the binding of endogenous alpha-2 adrenergic ligands (sees for example, R. Ruffolo, et al, Structure-Activity Relationships for alpha-2 Adrenergic Receptor Agonists and Antagonists, in The Alpha-2 Adrenergic Receptors (L Limbird, ed.) Humana, Clifton (1988); R. Pinder and J. Wieringa, Medicinal Research Reviews, 13(3), pages 259–325 (1993); J. McGrath, et al, Medicinal Research Reviews, 9(4), pages 407–533 (1989); and R. Ruffolo, et al, Medicinal Research Reviews, 14(2), pages 229–270 (1994)).

Particular alpha-2 adrenergic receptor antagonists suitable for use in the present invention include, but are not limited to, the following compounds:

methyl 17α-hydroxyyohimban-16α-carboxylate (yohimbine) as described in Doklady Adad. Nauk. S.S.S.R., 117, pages 81–83 (1957);

methyl 17α-hydroxy-20α-yohimban-16-carboxylate (rauwolscine) as described in GB 910,216;

methyl 17α-hydroxyyohimban-16β-carboxylate (corynanthine) as described in U.S. Pat. No. 4,490,379;

p-amino-17α-hydroxy-20α-yohimban-16-carboxanilide as described in Fed. Proc., 45, 1570 (1986);

2-(1,4-benzodioxan-2-ylmethyl)-1-ethylpyrrole (imoloxan) as described in U.S. Pat. No. 4,497,818;

2-(2-methoxy-1,4-benzodioxan-2-yl)-2-imidazoline (methoxyidazoxan)and its hydrochloride salt, as described in U.S. Pat. No. 4,446,148;

2-(1,4-benzodioxan-2-yl)-2-imidazoline (idazoxan) as described in WO 95/22,390;

N-[2-(2,6-dimethoxyphenoxy)ethyl]-1,4-benzodioxan-2-methylamine as described in J. Med. Chem., 36(11), pages 1520–1528 (1993);

5-fluoro-2,3,3αβ,9α-tetrahydro-1H-[1,4]benzodioxino[2,3-c]pyrrole (fluparoxan) as described in U.S. Pat. No. 4,880,801;

N-[2-(2,6-dimethoxyphenoxy)ethyl]-2,3-dihydro-3-phenyl-1,4-benzodioxin-2-methanamine, trans-(phendioxan) as described in J. Med. Chem., 36(11), pages 1520–1528 (1993);

1-(1,4-benzodioxan-2-ylmethyl)piperidine (piperoxan) as described in J. Med. Chem., 20(7), pages 880–885 (1977);

N-(1,3,4,6,7,11bα-hexahydro-2H-benzo[a]quinolizin-2β-yl)-N-methyl-1-propanesulfonamide as described in U.S. Pat. No. 4,454,139;

N-(1,3,4,6,7,11bα-hexahydro-2H-benzo[a]quinolizin-2β-yl)-N-methylmethanesulfonamide as described in U.S. Pat. No. 4,454,139;

N-(1,3,4,6,7,11bα-hexahydro-2H-benzo[a]quinolizin-2β-yl)-N,2-dimethyl-1-propanesulfonamide as described in U.S. Pat. No. 4,454,139;

N-{2-[(1,3,4,6,7,11bα-hexahydro-2H-benzo[a]quinolizin-2β-yl)(methylsulfonyl)amino]ethyl}-1-methylethanesulfonamide as described in U.S. Pat. No. 4,526,967;

N-(1,3,4,6,7,12bα-hexahydro-2H-benzofuro[2,3-a]quinolizin-2β-yl)-2-hydroxy-N-methylethanesulfonamide as described in U.S. Pat. No. 4,690,928;

N-[2-(1,3,4,6,7,12bα-hexahydro-2"-oxospiro[2H-benzofuro-[2,3-a]quinolizine-2,4'-imidazolidin]-3'-yl)ethyl]-methanesulfonamide, (2S)—as described in U.S. Pat. No. 4,916,223;

1,3,4,5',6,6',7,12bα-octahydro-1',3'-dimethylspiro[2H-benzofuro[2,3-a]quinolizine-2,4' (1'H)-pyrimidin-2' (3'H)-one], (2S)—as described in U.S. Pat. No. 4,810,504;

p-[N-(2-imidazolin-2-ylmethyl)-p-toluidino]phenol (phentolamine) as described in An. R. Acad. Farm., 57(4), pages 541–551 (1991);

2-benzyl-2-imidazoline (tolazoline) as described in U.S. Pat. No. 5,112,715;

4-chloro-2,3-dihydro-2-(2-imidazolin-2-ylamino)-1H-isoindole as described in U.S. Pat. No. 4,221,798;

2-[(3,4-dihydro-2-naphthyl)methyl]-2-imidazoline (napamezole) as described in U.S. Pat. No. 4,540,705;

2,3-dihydro-2-(2-imidazolin-2-ylmethyl)-1-methyl-1H-isoindole as described in U.S. Pat. No. 4,918,083;

5-chloro-2,3-dihydro-2-(2-imidazolin-2-ylmethyl)-1H-isoindole as described in U.S. Pat. No. 4,959,374;

2-(1,4-benzodioxan-2-ylmethyl)-1-ethylimidazole (imiloxan) as described in U.S. PAt. No. 4,497,818;

2-{[2-(2-imidazolin-2-yl)-1-phenyl]ethyl}pyridine (midaglizole) as described in Chem. Pharm. Bull., 28(5), pages 1394–1402 (1980);

4-(2-ethyl-2-indanyl)imidazole (atipamezole) as described in U.S. Pat. No. 4,933,359;

2-(2-ethyl-2,3-dihydro-2-benzofuranyl)-2-imidazoline (efaroxan) as described in U.S. Pat. No. 4,411,908;

5-[2-[[2-(2-ethoxyphenoxy)ethyl]amino]propyl]-2-methoxybenzenesulfonamide as described in U.S. Pat. No. 4,731,478;

3,4-dihydro-2-{[(p-hydroxyphenethyl)amino]methyl}-1 (2H)-naphthalenone as described in Geophys. Res. Lett., 15(12), 1453 (1988);

2-hydroxy-5-[1-hydroxy-2-[(1-methyl-3-phenylpropyl)-amino]ethyl]benzamide (labetalol) as described in U.S. Pat. No. 5,442,118;

9,10α-dihydro-12'-hydroxy-2'-(1-methylethyl)-5'α-(2-methylpropyl)ergotaman-3',6',18-trione (dihydroergocryptine) as described in U.S. Pat. No. 3,846,433;

2,3,9,13bβ-tetrahydro-1α,2-dimethyl-1H-dibenz[c,f]-imidazo[1,5-a]azepine as described in WO 84/2,704;

1,2,3,4,10,14b-hexahydro-2-methyldibenzo[c,f]pyrazino-[1,2-a]azepine (mianserin) as described in U.S. Pat. No. 4,217,452;

1,2,3,4,10,14bβ-hexahydro-2-methylpyrazino[2,1-a]pyrido-[2,3-c][2]benzazepine (mirtazapine) as described in U.S. Pat. No. 4,062,848;

1,3,4,14b-tetrahydro-2-methyl-2H,10H-pyrazino[1,2-a]-pyrrolo[2,1-c][1,4]benzodiazepine (aptazapine) as described in U.S. Pat. No. 4,316,900;

6-chloro-2,3,4,5-tetrahydro-3-methyl-1H-3-benzazepine as described in U.S. Pat. No. 4,541,954;

6-chloro-2,3,4,5-tetrahydro-3-methyl-9-[(3-methyl-2-butenyl)oxy]-1H-3-benzazepine as described in U.S. Pat. No. 4,683,229;

2,3,4,9-tetrahydro-2-methyl-1H-dibenzo[3,4:6,7]cyclo-hepta[1,2-c]pyridine (setiptiline) as described in U.S. Pat. No. 4,002,632;

1-(4-amino-6,7-dimethoxy-2-quinazolinyl)-4-(2-furanyl-carbonyl)piperazine (prazosin) as described in U.S. Pat. No. 4,062,844;

4-chloro-2-(methylamino)-6-(4-methyl-1-piperazinyl)-5-(methylthio)pyrimidine (mezilamine) as described in U.S. Pat. No. 3,843,656;

2-chloro-6-piperazin-1-ylpyrazine as described in U.S. Pat. No. 4,487,773;

2-piperazin-1-ylpyrimidine as described in U.S. Pat. No. 4,355,031;

5,8,8aα,9,10,11,12,12aα,13,13aα-decahydro-6H-benzo[g]-1,3-benzodioxolo[5,6-a]quinolizin-11α-ol as described in U.S. Pat. No. 4,851,416;

2-amino-6-(p-chlorobenzyl)-4,5,6,7-tetrahydro-8H-thiazolo [4,5-d]azepine as described in U.S. Pat. No. 3,804,849;

5,6,8aα,9,10,11,12,12aα,13,13aα-decahydro-3-methoxy-12-(methylsulfonyl)-8H-isoquino[2,1-g][1,6] naphthyridine as described in EP 524,004-A1; and other antagonists known in the alpha-2 adrenergic receptor art, and pharmaceutically acceptable derivatives, acid addition salts and possible stereochemically isomeric forms thereof, if and where appropriate. This invention is also intended to include any biologically active equivalents of an alpha-2 adrenergic receptor antagonist as described above.

Preferred alpha-2 adrenergic receptor antagonists include yohimbine hydrochloride, methoxyidazoxan hydrochloride and the like.

Acid addition salts suitable for use in this invention include any pharmaceutically acceptable acid addition salts. Preferred acid addition salts include hydrochloric acid, phosphoric acid, acetic acid, citric acid, gluconic acid and propionic acid addition salts.

Either or both yohimbine and its hydrochloride salt is naturally occurring. Either or both is extracted from the yohimbe tree. The yohimbine or salt molecule is an alkaloid.

Yohimbine or its salt has approved therapeutic uses in medicine, and is orally active. Although it is reported to have little specificity for $\alpha_2$ receptor subtypes, yohimbine hydrochloride has an affinity for $\alpha_2$ receptors about ten times higher than methoxyidazoxan hydrochloride. Also, it has been demonstrated that both yohimbine and methoxyidazoxan hydrochloride salts induce major effects on the manner in which swine partition nitrogen post-absorptively.

Advantageously, the present invention provides a method for increasing lean meat, improving the lean meat to fat ratio and improving amino acid utilization in warm-blooded animals by orally or parenterally administering to the animals an effective amount of an alpha-2 adrenergic receptor antagonist. The term alpha-2 adrenergic receptor antagonist as used herein is intended to include one or more alpha-2 adrenergic receptor antagonist compounds.

For oral administration, the alpha-2 adrenergic receptor antagonist is present in the animals' feed and/or drinking water or is administered to the animals in the form of a tablet, bolus or drench. Animal feed compositions effective for increasing lean meat, improving the lean meat to fat ratio and improving amino acid utilization in warm-blooded animals are generally prepared by admixing an alpha-2 adrenergic receptor antagonist or animal feed supplement containing said antagonist with a sufficient amount of a standard animal feed composition to provide from about 0.001 ppm to 500 ppm, preferably about 1 ppm to 150 ppm, of said antagonist in the finished feed. The alpha-2 adrenergic receptor antagonist may also be administered in the animals, drinking water at similar concentrations provided that the antagonist is water soluble.

Animal feed supplements may be prepared by admixing about 95% to 50% by weight of an alpha-2 adrenergic receptor antagonist with about 5% to 50% by weight of a carrier. Carriers suitable for use in the supplement compositions of this invention include, but are not limited to, alfalfa meal, soybean meal, cottonseed oil meal, linseed oil meal, sodium chloride, cornmeal, cane molasses, urea, bone meal, fish meal, corncob meal and the like and mixtures thereof. Advantageously, the carrier promotes a uniform distribution of the antagonist in the finished feed into which the supplement is blended. It thus performs an important function by ensuring proper distribution of the antagonist throughout the feed.

Additionally, the supplement may be used as a top dressing for feed. If the supplement is used as a top dressing, the carrier helps to ensure uniformity of distribution of the antagonist across the top of the dressed feed.

Parenteral administration of the alpha-2 adrenergic receptor antagonist may be by intravenous, subcutaneous, intramuscular or intraperitoneal injections or by implants. In general, parenteral administration involves injecting or implanting a sufficient amount of the antagonist to provide an animal with about 0.001 to 100 mg/kg body weight/day, preferably about 0.01 to 50 mg/kg body weight/day, of the antagonist In another aspect of the present invention, the alpha-2 adrenergic receptor antagonist may be administered to an animal in combination with or in conjunction with a beta-adrenergic agonist.

In order to facilitate a further understanding of the invention, the following examples are presented primarily for the purpose of illustrating more specific details thereof. The invention should not be deemed limited by the examples as the full scope of the invention is defined in the claims.

EXAMPLE 1

Nitrogen balance evaluation of test compounds administered in feed to swine

In this evaluation, the effect of test compounds on nitrogen balance in swine is determined.
Test Compounds
Yohimbine hydrochloride
Methoxyidazoxan hydrochloride
Animals Twenty four barrows (approximately 50–55 kg) are placed in metabolism crates.
Rations Pigs receive a 20% crude protein, 1.15% lysine basal diet Feed intake during the treatment period is limited to about 90% of that quantity freely consumed during the adaptation period (expressed as a percentage of body weight) for all pigs. Water is available ad libitum.
Experimental Design All animals receive the basal diet. The experimental design is a randomized complete block with six pigs receiving each of four experimental treatments. Animals are blocked on the basis of initial body weight at the time treatment administration begins. Treatments are administered in feed and include a nontreated control group, methoxyidazoxan hydrochloride in feed at 100 ppm, yohimbine hydrochloride in feed at 25 ppm and yohimbine hydrochloride in feed at 100 ppm. For all treatments, feed is offered in equal portions at 0700 hours and 1430 hours daily.

Animals are allowed to adapt to being housed in metabolism crates and receiving treatments. During this period, feed consumption is monitored to establish the maximum allowable level of feed offered which will result in complete consumption of the ration. The amount of feed offered (calculated as a percentage of body weight) does not change from at least three days prior to initiation of the collection period through completion of the study. The adaptation period is followed by five days during which feed consumption, and fecal and urinary output are measured. Samples of feed, feed refusals, feces and urine are collected daily and frozen for analyses.

To minimize nitrogen loss, urine is collected in containers to which 35 mL of 6 N HCl has been added.

| Schedule | |
|---|---|
| Day 1 | Place animals in metabolism crates. All pigs receive the basal diet for six days ad libitum twice daily. |
| Day 7 | Feed offered is adjusted to approximately 90% of the lowest level of feed intake. Feeding of medicated diets is begun. |
| Day 11 | Final level of feed consumption is set. |
| Day 13 | The crates are thoroughly washed to remove all urinary and fecal residues. Observation of nitrogen balance is begun. |
| Days 14–18 | All fecal and urinary matter as well as feed either wasted or refused is quantitatively recovered. Weights are recorded and samples are frozen. |

Feed and feces are composited on a weight basis for the whole collection period. Feed and feces samples are dried to constant weight at about 100° C. Dried materials are ground through a 2 mm screen in a Wiley mill and allowed to air equilibrate. Nitrogen determinations are then made by macro-Kjeldahl procedures. The results are summarized in Table I.

TABLE I

| | Control | Methoxyidazoxan Hydrochloride (100 ppm) | Yohimbine Hydrochloride (25 ppm) | Yohimbine Hydrochloride (100 ppm) |
|---|---|---|---|---|
| Number of pigs | 6 | 6 | 6 | 6 |
| Drug consumed (mg/head/day) | 0.0 | 181.6 | 45.9 | 176.4 |
| Nitrogen intake (g/head/day) | 58.8 | 59.9 | 60.5 | 58.2 |
| Fecal nitrogen excretion | | | | |
| g/head/day | 7.3 | 11.5 | 9.7 | 9.9 |
| % of intake | 12.4 | 19.2 | 16.0 | 16.8 |
| Absorbed nitrogen (g/head/day) | 51.6 | 48.4 | 50.9 | 48.3 |
| Urinary nitrogen excretion | | | | |
| g/head/day | 27.5 | 23.5 | 23.3 | 20.7 |

TABLE I-continued

|  | Control | Methoxy-idazoxan Hydro-chloride (100 ppm) | Yohimbine Hydrochloride | |
|---|---|---|---|---|
|  |  |  | (25 ppm) | (100 ppm) |
| # of nitrogen intake | 46.9 | 39.2 | 38.4 | 35.5 |
| % of absorbed nitrogen | 53.5 | 48.6 | 45.6 | 42.8 |
| Retained nitrogen |  |  |  |  |
| g/head/day | 24.1 | 24.9 | 27.5 | 27.6 |
| % of nitrogen intake | 40.8 | 41.7 | 45.6 | 47.7 |
| % of absorbed nitrogen | 46.5 | 51.4 | 54.4 | 57.2 |

As can be seen from the data in Table I, pigs treated with methoxyidazoxan hydrochloride or yohimbine hydrochloride retain more nitrogen than the nontreated pigs. A higher level of retained nitrogen indicates that more lean meat is being produced in the treated pigs compared to the nontreated pigs.

Using essentially the same procedure, higher levels of retained nitrogen are found in pigs receiving feed containing 35.5, 75 or 150 ppm of methoxyidazoxan hydrochloride compared to nontreated pigs. The results are summarized in Table II.

TABLE II

|  |  | Methoxyidazoxan Hydrochloride | | |
|---|---|---|---|---|
|  | Control | (37.5 ppm) | (75 ppm) | (150 ppm) |
| Number of pigs | 6 | 5 | 6 | 6 |
| Drug consumed (mg/head/day) | 0.0 | 68.5 | 130.9 | 268.2 |
| Nitrogen intake (g/head/day) | 58.1 | 58.3 | 57.1 | 56.4 |
| Fecal nitrogen excretion |  |  |  |  |
| g/head/day | 7.9 | 8.0 | 8.7 | 9.1 |
| # of intake | 13.5 | 13.8 | 15.2 | 16.1 |
| Absorbed nitrogen (g/head/day) | 50.2 | 50.2 | 48.3 | 47.3 |
| Urinary nitrogen excretion |  |  |  |  |
| g/head/day | 29.5 | 28.9 | 25.5 | 25.7 |
| # of nitrogen intake | 50.9 | 49.7 | 44.7 | 45.8 |
| # of absorbed nitrogen | 58.9 | 57.6 | 52.7 | 54.6 |
| Retained nitrogen |  |  |  |  |
| g/head/day | 20.7 | 21.3 | 22.9 | 21.5 |
| # of nitrogen intake | 35.5 | 36.5 | 40.1 | 38.1 |
| # of absorbed nitrogen | 41.1 | 42.4 | 47.3 | 45.4 |

EXAMPLE 2

Nitrogen balance evaluation of methoxyidazoxan hydrochloride administered by subcutaneous injection into swine Using essentially the same procedure as described in Example 1, but subcutaneously injecting methoxyidazoxan hydrochloride (25 mg in 1 mL saline) into swine at 8 hour intervals, higher levels of retained nitrogen are found in treated pigs compared to nontreated pigs. The results are summarized in Table III.

TABLE III

|  | Control | Methoxyidazoxan Hydrochloride |
|---|---|---|
| Number of pigs | 11 | 11 |
| Drug administered (mg/head/day) | 0.0 | 75 |
| Nitrogen intake (g/head/day) | 57.2 | 55.5 |
| Fecal nitrogen excretion |  |  |
| g/head/day | 8.9 | 9.7 |
| % of intake | 15.5 | 17.6 |
| Absorbed nitrogen (g/head/day) | 48.3 | 45.8 |
| Urinary nitrogen excretion |  |  |
| g/head/day | 28.9 | 23.3 |
| % of nitrogen intake | 50.4 | 41.7 |
| % of absorbed nitrogen | 59.7 | 50.5 |
| Retained nitrogen |  |  |
| g/head/day | 19.4 | 22.5 |
| % of nitrogen intake | 34.1 | 40.7 |
| % of absorbed nitrogen | 40.3 | 49.5 |

As can be seen from the data in Table III, pigs treated with methoxyidazoxan hydrochloride retained significantly more nitrogen than the nontreated pigs. A higher level of retained nitrogen indicates that more lean meat is being produced in the treated pigs compared to the nontreated pigs.

EXAMPLE 3

To evaluate the hypothesis that $\alpha_2$ adrenoceptor antagonists will effect improvements in the value of hog carcasses, an experiment with finishing hogs was conducted to determine if yohimbine hydrochloride has effects on performance and carcass composition in swine raised under practical rearing conditions. The experiment was a randomized complete block experimental design with 5 treatments. Animals (N=75 gilts and 75 barrows) were assigned to pens based on sex and initial weight. Treatments included nontreated controls, yohimbine hydrochloride at 6.25, 25 or 100 ppm in the diet, or cimaterol at 1 ppm in the diet. Animals began the experiment at an average weight of about 60 kg and were on test until the average pen weight was 110 kg. When this weight was achieved, animals were slaughtered and weights of internal organs and selected muscles were measured. Measurements of carcass fatness and muscling were also evaluated. The experiment is summarized in Tables IV to VI.

As shown in Table IV, initial and final animal weights were not affected by treatments. However, the time taken to reach market weight, as well as the rate and efficiency of gain were dramatically affected by treatment. Animals consuming a diet containing 6.25 ppm yohimbine hydrochloride gained similar to nontreated controls, but animals receiving 25 or 100 ppm yohimbine hydrochloride gained 8.1% and 18.7% slower, respectively, than nontreated controls. As a result of slower rates of gain, the number of days required to reach market weight increased (compared to nontreated controls) for animals consuming diets containing 25 or 100 ppm yohimbine hydrochloride, but no effect was noted among animals fed 6.25 ppm yohimbine hydrochloride. Animals fed diets containing 1 ppm of the β-agonist cimaterol gained 6.3% faster than nontreated controls, but time required to achieve market weight was not significantly impacted. Cimaterol and its uses are disclosed in the prior art. E.g., see The Merck Index, Twelfth Ed., monograph 2336, page 382, Merck & Co., N.J., USA 1996 and U.S. Pat. No. 4,407,819 issued Oct. 4, 1983, which are incorporated herein by reference.

A primary reason for decreased weight gains among animals fed diets containing yohimbine hydrochloride was that feed consumption was decreased (Table IV), especially among pigs consuming the diet containing 100 ppm of the drug, where feed consumption was decreased 8% compared to nontreated controls. However, reductions in weight gain were not proportional to reductions in feed consumption since feed efficiency was affected by treatment. Feed efficiency followed a trend toward greater depression as drug dose became higher. At 6.25 ppm, feed efficiency was identical to nontreated controls; at 25 ppm feed intake was 5.8% less than nontreated controls, although not enough to result in statistical significance; and at 100 ppm, yohimbine hydrochloride induced an 11.9% decrease in feed efficiency. Cimaterol caused an 11.2% increase in feed efficiency owing to the fact that while rate of weight gain increased, feed consumption was decreased 5%.

Data pertaining to weight of organs measured at the time of slaughter are presented in Table V. Trends in data suggest medications impacted organ weights Compared to nontreated controls, for example, feeding diets containing 6.25 or 25 ppm yohimbine hydrochloride resulted in nonsignificant increases in the mass of hearts of 3.0 and 3.6% respectively, and at 100 ppm the increase was 7.6%. Liver size, on the other hand, tended to show the reverse trend. Livers from pigs fed 6.25 ppm yohimbine hydrochloride were 5.8% heavier than nontreated controls; among pigs fed 25 ppm livers were 2.7% heavier than controls; and among pigs fed 100 ppm 2.9% lighter than nontreated controls. Kidney weights tended to follow a trend across doses of yohimbine hydrochloride similar to effects on livers whereby kidney weights became lighter as drug dose became higher.

Leaf fat weight was 14.9% less than nontreated controls among pigs fed 6.25 yohimbine hydrochloride, and although not significant, was 5.2% less than nontreated controls among pigs fed 100 ppm yohimbine hydrochloride. Semitendinosus muscle weights from animals fed yohimbine hydrochloride were not different from nontreated controls. With respect to organ weights, cimaterol elicited all the classic effects of a β-agonist, including decreased visceral organ size, significant reductions in leaf fat mass, and increased muscle mass, including increased semitendinosus muscle mass.

Carcass data are presented in Table VI. No effect of yohimbine hydrochloride was noted on carcass weight, but dressing percentage was affected. Dressing percent among pigs fed 6.25 ppm yohimbine hydrochloride was 1.6% lower than nontreated controls; among pigs fed cimaterol dressing percent tended to be greater than nontreated controls. These effects are a likely a direct consequence of effects of these drugs on organ mass.

Fat thickness measurements on carcasses were generally in agreement, and suggest that both yohimbine hydrochloride and cimaterol caused reductions in the amount of fat in animals compared to nontreated controls.

Loin eye area measurements tended to suggest that increasing the concentration of yohimbine hydrochloride in diets resulted in greater loin eye area indicative of greater protein anabolism. However, only among animals fed diets containing 1 ppm cimaterol was loin eye area significantly increased (8.5%).

Corrected for a 104 kg pig (using the method disclosed in D. Boggs and R. Merkel, *Live Animal Carcass Evaluation and Selection Manual*, Kendall/Hunt Publishing Co., IA, USA,1979, which is incorproated herein by reference), adjusted 10th rib backfat was reduced about 20% among pig fed 6.25 or 100 ppm yohimbine hydrochloride, or 1 ppm cimaterol compared to nontreated controls. Among pigs fed 25 ppm yohimbine hydrochloride, adjusted 10th rib backfat was reduced 10%. Adjusted loin eye area tended to be greater with increasing doses of yohimbine hydrochloride. Among pigs fed 1 ppm cimaterol this effect was statistically significant.

The cumulative effect of treatments on adipose tissue and muscle can be calculated from carcass lean measurements (using the method disclosed in National Pork Producers Council, *Procedures to Evaluate Market Hog Performance*, 2nd Edition, IA, USA, 1983, which is incorporated herein by reference), and is presented in Table VI. Data generated in the present experiment demonstrated that lean yield, expressed as a percentage of carcass weight, is significantly increased by the same amount by treating animals with 6.25 or 100 ppm yohimbine hydrochloride, or 1 ppm cimaterol. The effect among pigs fed 25 ppm was less dramatic.

Data from this experiment support the contention that treatment of meat animals with $\alpha_2$ receptor antagonists may be a useful means of increasing the proportion of lean to fat in carcasses

TABLE IV

Effects of yohimbine hydrochloride or cimaterol on performance of finishing swine.

|  | yohimbine hydrochloride, ppm | | | 1 ppm |
|---|---|---|---|---|
| Item | Control | 6.25 | 25 | 100 | cimaterol |
| No. Pens/pigs | 6/30 | 6/30 | 6/30 | 6/28 | 6/30 |
| Body weight, kg | | | | | |
| Initial | 59.9 | 60.2 | 60.1 | 60.4 | 60.2 |
| Final | 110.7 | 110.6 | 111.1 | 110.3 | 109.7 |
| Days on experiment | 49.8 | 51.2 | 54.8 | 60.5 | 46.2 |
| Daily gain, g/d | | | | | |
| Body weight | 1019 | 984 | 936 | 828 | 1083 |
| Lean tissue | 415 | 403 | 399 | 381 | 433 |
| Daily feed intake, g/pig/d | 3499 | 3355 | 3388 | 3219 | 3325 |
| Gain/Feed | .294 | .294 | .27 | .259 | .327 |

TABLE V

Effects of yohimbine hydrochloride or cimaterol on organ weights of finishing swine.

|  | yohimbine hydrochloride, ppm | | | 1 ppm |
|---|---|---|---|---|
| Item | Control | 6.25 | 25 | 100 | cimaterol |
| No. Pens/pigs | 6/30 | 6/60 | 6/30 | 6/28 | 6/30 |
| Organ weight, g | | | | | |
| Heart | 473 | 487 | 490 | 509 | 430 |
| Liver | 1831 | 1938 | 1880 | 1777 | 1713 |
| Kidneys | 435 | 464 | 418 | 412 | 412 |
| Spleen | 227 | 234 | 195 | 221 | 205 |
| Leaffat | 734 | 625 | 767 | 696 | 552 |
| Semitendinosus muscle (1) | 474 | 471 | 453 | 491 | 510 |
| Organ weight, % of body weight | | | | | |
| Heart | .427 | .441 | .442 | 461 | .393 |
| Liver | 1.654 | 1.754 | 1.692 | 1.611 | 1.563 |
| Kidneys | .393 | .420 | .376 | .374 | .375 |
| Spleen | .205 | .212 | .176 | .200 | .187 |
| Leaf fat | .663 | .565 | .689 | .629 | .505 |
| Semitendinosus muscle (1) | .428 | .427 | .408 | .445 | .464 |

(1) Measured on one side only.

TABLE VI

Effects of yohimbine hydrochloride or cimaterol on carcass traits of finishing swine.

|  | | yohimbine hydrochloride, ppm | | | 1 ppm |
|---|---|---|---|---|---|
| Item | Control | 6.25 | 25 | 100 | cimaterol |
| No. Pens/pigs | 6/30 | 6/60 | 6/30 | 6/28 | 6/30 |
| Carcass weight, kg | 77.8 | 76.4 | 77.6 | 77.4 | 78.0 |
| Dressing percent | 70.2 | 69.1 | 69.8 | | 70.2 |
| 71.1 | | | | | |
| Carcass length | 82.4 | 82.4 | 82.1 | 82.2 | 81.0 |
| Fat thickness, cm | | | | | |
| 1st rib | 3.36 | 3.08 | 3.50 | 3.23 | 3.04 |
| Last rib | 1.79 | 1.62 | 1.78 | 1.63 | 1.82 |
| Lumbar | 1.31 | 1.10 | 1.26 | 1.20 | 1.17 |
| P2 | 1.20 | 1.06 | 1.16 | 1.04 | 1.03 |
| 10th rib | 1.98 | 1.59 | 1.78 | 1.56 | 1.56 |
| Loin eye area, square cm | 8.2 | 46.9 | 48.9 | 50.2 | 52.3 |
| Adjusted 10th rib fat, cm | 1.84 | 1.49 | 1.66 | 1.46 | 1.48 |
| Adjusted loin eye area, cm$^2$ | 46.9 | 45.6 | 47.5 | 48.9 | 51.2 |
| Calculated lean | | | | | |
| Kg | 43.1 | 43.9 | 43.7 | 44.4 | 44.8 |
| Percent in carcass | 55.6 | 57.5 | 56.4 | 57.5 | 57.5 |

We claim:

1. A method for increasing lean meat, improving the lean meat to fat ratio and improving amino acid utilization in swine which comprises administering to said swine a lean meat increasing, lean meat to fat ratio improving and amino acid utilization improving amount of an alpha-2 adrenergic receptor antagonist selected from the group consisting of methyl 17α-hydroxyyohimban-16α-carboxylate;

methyl 17α-hydroxy-20α-yohimban-16-carboxylate;

methyl 17α-hydroxyyohimban-16β-carboxylate;

p-amino-17α-hydroxy-20α-yohimban-16-carboxanilide;

2-(1,4-benzodioxan-2-ylmethyl)-1-ethylpyrrole;

2-(2-methoxy-1,4-benzodioxan-2-yl)-2-imidazoline;

2-(1,4-benzodioxan-2-yl)-2-imidazoline;

N-[2-(2,6-di methoxyphenoxy)ethyl]-1,4-benzodioxan-2-methylamine;

5-fluoro-2,3,3aβ,9aα-tetrahydro-1H-[1,4]benzodioxino[2,3-c]pyrrole;

N-[2-(2,6-dimethoxyphenoxy)ethyl]-2,3-dihydro-3-phenyl-1,4-benzodioxin-2-methanamine, trans;

1-(1,4-benzodioxan-2-ylmethyl)piperidine; and 2-(1,4-benzodioxan-2-ylmethyl)-1-ethylimidazole; or an acid addition salt thereof.

2. The method according to claim 1 wherein the alpha-2 adrenergic receptor antagonist is parenterally administered to said swine.

3. The method according to claim 1 wherein the alpha-2-adrenergic receptor antagonist is selected from the group consisting of methyl 17α-hydroxyyohimban-16α-carboxylate hydrochloride and 2-(2-methoxy-1,4-benzodioxan-2-yl)-2-imidazoline hydrochloride.

4. The method according to claim 1 wherein the alpha-2 adrenergic receptor antagonist is orally administered to said swine.

5. The method according to claim 4 wherein said antagonist is administered to said swine in animal feed containing about 0.001 ppm to 500 ppm of said antagonist.

6. The method according to claim 5 wherein said animal feed contains about 1 ppm to 150 ppm of said antagonist.

\* \* \* \* \*